United States Patent
Grote

(10) Patent No.: US 8,431,228 B2
(45) Date of Patent: Apr. 30, 2013

(54) CERAMIC COMPONENT WITH SURFACE RESISTANT TO HOT GAS AND METHOD FOR THE PRODUCTION THEREOF

(75) Inventor: Holger Grote, Bonn (DE)

(73) Assignee: Siemens Aktiengesellschaft, München (DE)

( * ) Notice: Subject to any disclaimer, the term of this patent is extended or adjusted under 35 U.S.C. 154(b) by 658 days.

(21) Appl. No.: 11/988,323

(22) PCT Filed: Jun. 30, 2006

(86) PCT No.: PCT/EP2006/063754
§ 371 (c)(1),
(2), (4) Date: Feb. 6, 2009

(87) PCT Pub. No.: WO2007/003605
PCT Pub. Date: Jan. 11, 2007

(65) Prior Publication Data
US 2009/0181257 A1    Jul. 16, 2009

(30) Foreign Application Priority Data
Jul. 4, 2005 (EP) .................................. 05014473

(51) Int. Cl.
*B32B 9/04* (2006.01)
*B05D 3/02* (2006.01)
*B05D 3/12* (2006.01)

(52) U.S. Cl.
USPC ..... 428/446; 428/701; 416/241 R; 416/241 B

(58) Field of Classification Search ........................ None
See application file for complete search history.

(56) References Cited

U.S. PATENT DOCUMENTS

| 2,272,618 | A | * | 2/1942 | Fessler et al. ................. 501/153 |
| 5,236,151 | A |   | 8/1993 | Hagle et al. |
| 5,660,885 | A | * | 8/1997 | Hasz et al. ................. 427/374.5 |
| 5,688,347 | A | * | 11/1997 | Connolly et al. ........... 156/89.11 |
| 5,851,679 | A |   | 12/1998 | Stowell et al. |
| 5,871,820 | A | * | 2/1999 | Hasz et al. ................. 427/419.2 |
| 5,902,363 | A | * | 5/1999 | Connolly et al. .............. 55/487 |
| 5,914,189 | A | * | 6/1999 | Hasz et al. .................... 428/335 |
| 6,027,826 | A | * | 2/2000 | deRochemont et al. ...... 428/702 |
| 6,197,429 | B1 | * | 3/2001 | Lapp et al. .................... 428/450 |
| 6,210,791 | B1 |   | 4/2001 | Skoog et al. |
| 6,218,029 | B1 | * | 4/2001 | Rickerby ....................... 428/615 |
| 6,265,077 | B1 | * | 7/2001 | Ikeda et al. .................... 428/446 |
| 6,759,151 | B1 |   | 7/2004 | Lee |
| 6,875,529 | B1 |   | 4/2005 | Spitsberg et al. |
| 2003/0049499 | A1 | * | 3/2003 | Murakawa et al. ........... 428/697 |
| 2003/0211370 | A1 | * | 11/2003 | Cao ................................ 428/702 |
| 2005/0112381 | A1 |   | 5/2005 | Raybould et al. |

FOREIGN PATENT DOCUMENTS

| EP | 0 558 540 B1 |   | 9/1993 |
| JP | 2001048662 | * | 2/2001 |
| WO | WO 2004/079284 A1 |   | 9/2004 |

* cited by examiner

*Primary Examiner* — Vera Katz

(57) ABSTRACT

The invention relates to a ceramic component comprising a surface which is resistant to hot gas, and a method for the production thereof. Said ceramic component comprises a ceramic body and a surface which is resistant to hot gas. According to the invention, the surface which is resistant to hot gas is provided with a poorly reactive mineral coating.

6 Claims, 2 Drawing Sheets

CERAMIC COMPONENT WITH SURFACE RESISTANT TO HOT GAS AND METHOD FOR THE PRODUCTION THEREOF

CROSS REFERENCE TO RELATED APPLICATIONS

This application is the US National Stage of International Application No. PCT/EP2006/063754, filed Jun. 30, 2006 and claims the benefit thereof. The International Application claims the benefits of European application No. 05014473.2 filed Jul. 4, 2005, both of the applications are incorporated by reference herein in their entirety.

FIELD OF INVENTION

The present invention relates to a ceramic component with surface resistant to hot gas and method for the production thereof. In addition the present invention relates to a combustion space, especially a gas turbine combustion chamber.

BACKGROUND OF THE INVENTION

The walls of combustion spaces which conduct hot gases such as those of the combustion chambers of gas turbine installations required a thermal shielding of the supporting wall structure against attack by the hot gases. The thermal shielding can for example be implemented by a lining resistant to hot gases placed in front of the actual wall structure in the form of a ceramic heat shield. Ceramic materials offer the ideal solution compared to metallic materials for constructing this type of heat shield because of the ability to withstand higher temperatures, resistance to corrosion and their lower thermal conductivity. The heat shield is generally constructed from a number of ceramic heat shield elements, which form a flat lining for the combustion space. A ceramic heat shield of this type is described in EP 0 558 540 B1 for example.

For operation of a combustion space and especially for operation of gas turbine combustion chambers the heat shield is exposed to extreme stresses. As well as thermal and mechanical stresses the heat shield elements are also exposed to heavily corrosive stresses as a result of the flow of hot gas. The corrosive loads can result in a loss of material on the heat shield element which reduces its lifetime. This loss of material is attributable to a combination of corrosion, subsequent post-sintering of the surface and erosive stress resulting from the high mass flow rate of flowing hot gas. In gas turbine combustion chambers the loss of material on the surface of ceramic heat shield elements is especially great in the transition area from the combustion chamber to the turbine.

SUMMARY OF INVENTION

The object of the present invention is thus to make available an advantageous ceramic component for use in a combustion space, especially in a gas turbine combustion chamber. It is a further object of the present invention to make available a combustion space with an improved heat shield. Finally it is an object of the present invention to make available a method for producing an advantageous ceramic component.

The first object is achieved by a ceramic component as claimed in the claims, the second object by a combustion space as claimed in the claims and the third object by a method in accordance with the claims. The dependent claims contain advantageous embodiments of the invention.

An inventive ceramic component features a ceramic body as well as a surface which is resistant to hot gas. The ceramic body can for example be made of a basic material comprising up to 50% by weight mullite ($3Al_2O_3 \times 2SiO_2$ or $2Al_2O_3 \times SiO_2$) and more than 50% by weight corundum ($Al_2O_3$). In addition the basic material can contain small amounts of glassy phase ($SiO_2$), i.e. with a proportion of maximum 5% by mass. A surface which is resistant to hot gas is provided with a poorly reactive mineral coating in the inventive ceramic component. In particular coatings which include as one of their main coating materials corundum (aluminum oxide $Al_2O_3$), zirconia (zirconium oxide, $ZrO_2$) or spinel ($MgAl_2O_4$) can be considered as poorly reactive mineral coatings. It is especially advantageous in this case for the coating to contain at least 90% by mass of the major coating material. For stabilization of the coating and/or to increase its temperature stability it can contain a suitable doping, for example elements of lanthanide or titanium.

As a result of the poorly reactive mineral coating chemical reactions which increase the susceptibility of the ceramic material to erosion can be effectively suppressed. The loss of material when subjected to a flow of hot gas is attributable in ceramic components made up of a basic material comprising mullite and corundum, to the following two reactions: 1. Degradation of the mullite, 2. Grain growth and post-sintering.

The water vapor which is normally present in the hot gas flow leads to the $SiO_2$ in the mullite of the basic material being able to escape as $SiO_X$ in the gas phase, which leads to the degradation of mullite. The $Al_2O_3$ from the mullite remains in the coating and forms fine corundum grains there, the so-called secondary corundum. The secondary corundum grains show grain growth and post-sintering. Grain growth and post-sintering increase over the duration of operation i.e. as the time during which the ceramic component is exposed to the flowing hot gas increases. These processes thus lead, as the length of time during which the system is operated increases, to a weakening of the surface, through the formation of microcracks for example. The result of the weakening of the surface is surface particles—or even whole surface areas—of the ceramic component are removed by the flow of hot gas. As soon as a certain amount of surface material is removed or eroded, the corresponding ceramic components must be replaced, since their functional integrity can no longer be guaranteed.

By sealing the surface with the poorly reactive mineral coating (EBC Environmental Barrier Coating) the corrosive phases of the basic material $SiO_2$ on the surface of the component can be effectively suppressed when the surface is subjected to hot gas. This makes the surface less susceptible to erosion. Thus for example a surface coating based on corundum can extend the service life of a ceramic component in the hot gas stream significantly before it has to be replaced. Post-sintering can be suppressed even more effectively with a coating based on spinel than with a coating based on corundum. The lifetime of the ceramic component can thus be extended even more with a spinel-based coating. Both the corundum-based coating and the spinel-based coating retain their basic material characteristics, for example a high resistance to changes in temperature, even when attacked by heat and high temperatures over a long period.

Especially advantageous are the material characteristics of the coating, if the proportion of the material on which the coating is based amounts to at least 90 percent by mass and the glassy component is less than 2 percent by mass. Preferably no glass at all is present in the coating material.

An inventive combustion space which can in particular be embodied as a gas combustion chamber, has a wall structure and a ceramic heat shield located in front of the wall structure facing towards the inside of the combustion space. The ceramic heat shield is constructed from a number of inventive ceramic components, i.e. from a number of ceramic heat shield elements.

The maintenance intervals can be increased and the replacement rate of heat shield elements reduced as a result of the increased resistance of the heat shield to erosion.

In the inventive method for producing a ceramic component with a surface resistant to hot gases a poorly reactive mineral coating is applied to the surface which is resistant to hot gases. In particular coatings based on corundum, coatings based on zirconia and also coatings based on spinel enter into consideration as coatings here.

As already described previously in relation to the inventive ceramic component, the poorly reactive coating increases the resistance properties of the ceramic component equipped with it. For the poorly reactive mineral coating used in the inventive method what has already been stated in relation to the poorly reactive mineral coating of the inventive ceramic component similarly applies.

The poorly reactive mineral coating can be applied to both a sintered ceramic component and also to an unsintered ceramic component known as a green body. In both cases the coating process involves applying a material compound and subsequent sintering. When the coating is applied to a green body this sinter process can be undertaken together with the sintering of the green body. It is also possible to apply the poorly reactive mineral coating to an existing ceramic component which already has a certain service life behind it. In this way a ceramic combustion space lining might be retrofitted with the poorly reactive mineral coating. The coating can however also be applied when a new ceramic component is produced.

The material compound can be applied to the surface of the component in numerous ways, for example by painting, spraying, such as plasma injection or flame injection, applying as putty, dipping, through physical deposition from the gas phase etc. However the material is preferably applied by spraying it on or by spin coating.

The material compound which is applied to the surface to be coated can essentially consist entirely of corundum. Alternatively it is however also possible to add to the material compound further components in addition to corundum, for example magnesium oxide (MgO). Especially if the compound has a proportion of at least 60 percent by mass corundum and a proportion of at most 40 percent by mass magnesium oxide, the subsequent sinter process leads to a spinel-based coating.

The material compound for the coating also features further components such as zirconia. It is however also possible for zirconia to be the only component of the material compound so that a coating based on zirconia is produced.

BRIEF DESCRIPTION OF THE DRAWINGS

Further features, characteristics and advantages of the present invention emerge from the description of an exemplary embodiment given below which refers to the enclosed figures.

DETAILED DESCRIPTION OF INVENTION

Figure 1:
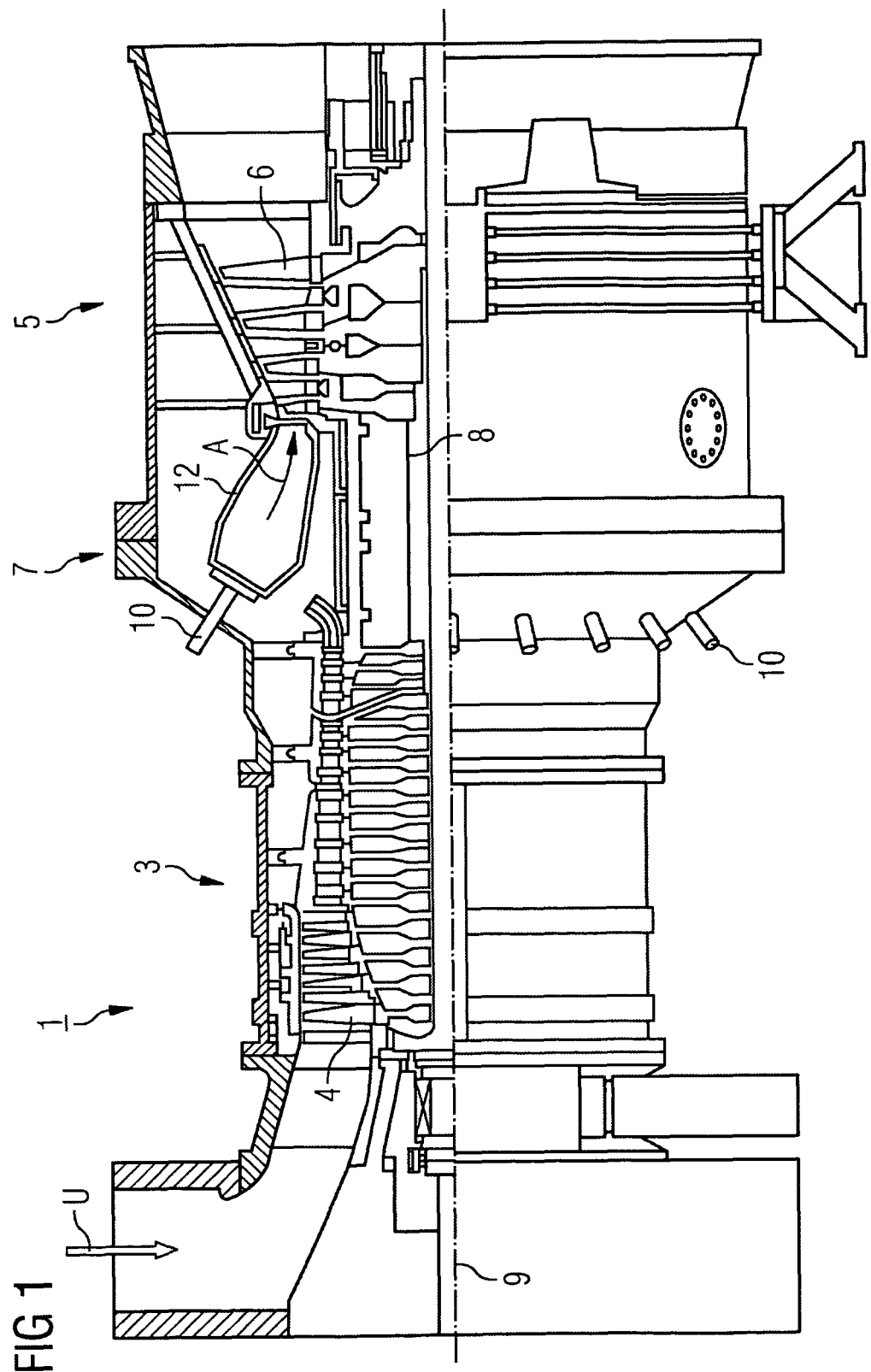
FIG. 1 shows a gas turbine installation in a partly cutaway side view.

The invention is described below with reference to a ceramic heat shield element for constructing a ceramic heat shield on the wall of a gas turbine combustion chamber.

A gas turbine installation 1 comprises a compressor section 3, a turbine section and a burner section 7. In the compressor section 3 and in the turbine section 5 compressor blades 4 or turbine blades 6 are arranged on common shaft 8 which is also referred to as the turbine rotor. The turbine rotor 8 is supported to allow rotation around a central axis 9.

The burner section comprises a numbers of burners 10 which come out into a combustion chamber 12 which in its turn comes out into the turbine section 5. In the present exemplary embodiment the combustion chamber 12 is embodied as an annular combustion chamber, i.e. it extends in a ring around the turbine rotor, and is lined with a ceramic heat shield.

During operation of the gas turbine installation 1 surrounding air U is sucked in via the compressor, compressed to a high pressure and output into the burner section 7 as so-called compressor air. In the burner section 7 the compressor air enters the burner 10 and is mixed with the fuel fed to the burner 10 and is burned in the combustion chamber 12. The combustion gases arising in this process form a working medium A which flows through the combustion chamber to the turbine section 5 and in the turbine section, by expanding and cooling down, imparts impulses to the turbine blades 6. The geometry of the turbine blades ensures in such cases that the impulse causes the turbine rotor 8 to start rotating. The rotating turbine rotor 8 on the one hand drives the compressor and is also coupled to a load (not shown), for example an electrical generator for generating current.

Figure 2:
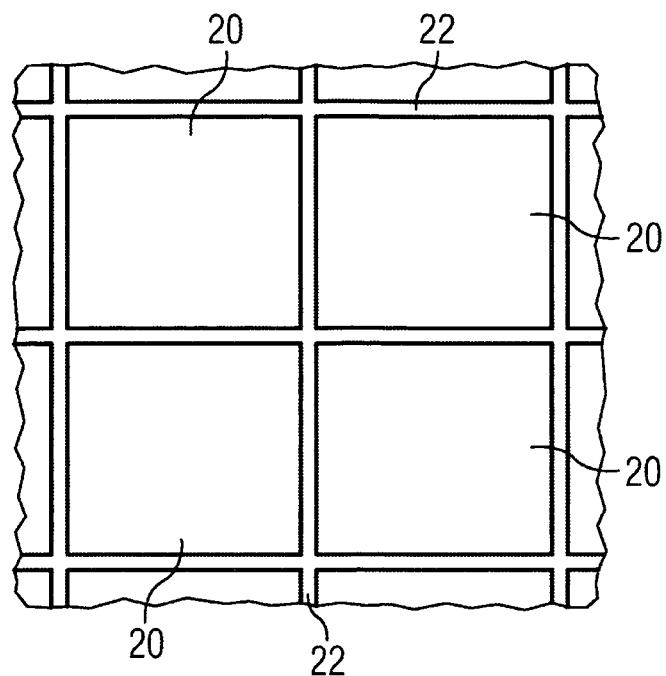
FIG. 2 shows a ceramic heat shield arranged on a combustion space wall.

A section from the combustion chamber wall is depicted in FIG. 2. The figure shows an overhead view of the combustion chamber wall seen from inside the combustion chamber. The combustion chamber wall is provided with a ceramic heat shield which is constructed from a number of ceramic heat shield elements 20. The heat shield elements 20 are arranged to cover the entire surface of the actual combustion chamber wall such that they are located facing towards the inside of the combustion chamber. Between adjacent heat shield elements 20 there are gaps 22 to allow the individual heat shield elements to expand on contact with the flowing hot gas without them hitting each other.

Figure 3:
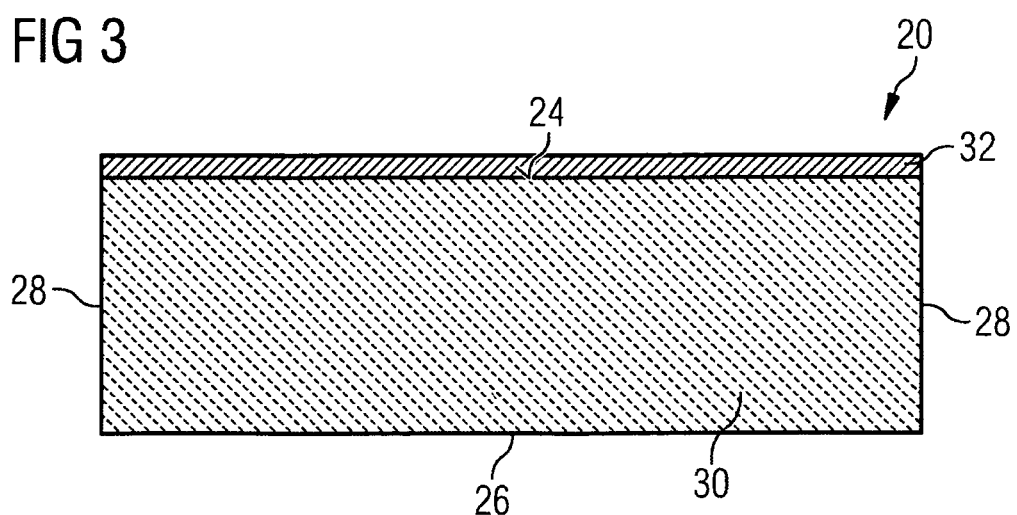
FIG. 3 shows an inventive ceramic component in a cutaway side view.

A ceramic heat shield element 20 is shown in FIG. 3 in a cutaway schematic side view. The heat shield element 20 comprises a hot side 24 which faces the flow of hot gas, if the heat shield element 20 is built into a heat shield and which represents a surface of the heat shield element 20 which is resistant to hot gas. Opposite the hot gas side 24 the heat shield element 20 has a cold side which faces the supporting wall structure of the combustion chamber 12 if the heat shield element is built into a heat shield. Extending between the hot side 24 and the cold side 26 are circumferential sides 28.

The ceramic body 30 of the heat shield element 20 is made of a basic material which comprises around 10% by mass to around 50% by mass mullite ($3Al_2O_3 \times 2SiO_2$ or $2Al_2O_3 \times SiO_2$) and around 50% by mass to around 90% by mass corundum ($Al2O3$) as well as maximum 5% by mass glassy phase ($SiO_2$). Such a body can for example be produced by a molding compound which comprises $Al_2O_3$ and $SiO_2$ in powder form, being pressed or molded into shape and subsequently sintered.

The molding compound can for example comprise a proportion of 80% or more by mass $Al_2O_3$ and 20% or less by mass $SiO_2$. During sintering a ceramic is produced from this which has a proportion of mullite of up to appr. 50% by mass and a proportion of corundum of over appr. 50% by mass. Instead of $Al_2O_3$ and $SiO_2$ in powder form the compound can also already contain corundum and mullite in powder form. In addition the molding compound can also contain an additive, for example zirconium oxide ($ZrO_2$) in the range of up 30 percent by mass.

The hot combustion gases flowing through the combustion chamber 12 contain a certain amount of water vapor. This water vapor can lead to removal of mullite and glassy phase if these are exposed directly to the hot exhaust gases. To suppress the removal of mullite and glassy phase the hot side 24 of the heat shield element 20 is provided with a poorly reactive mineral coating 32. In the present exemplary embodiment this coating 32 includes spinel, i.e. $MgAl_2O_4$ as its main component. Its thickness amounts to less than 1 mm, preferably less than 0.5 mm.

This poorly reactive mineral coating restricts the post-sintering in the area of the hot gas side 24. The removal of material described at the start in relation to the prior art can thus be effectively reduced by means of the coating. The use of spinel as the main component of the coating thus leads to the basic material characteristics, such as resistance to changes in temperature for example, being maintained, even after long exposure to hot gas. Overall this allows the lifetime of the heat shield element 20 to be extended.

To produce the spinel-based coating a material compound is applied to the surface of an already pressed heat shield element to be produced, known as the green body, prior to sintering, which contains $Al_2O_3$ with a proportion of over 60% by mass and magnesium oxide (MgO) with a proportion of up to 40% by mass. When sintering at temperatures of up to a maximum of around 1650° C. is subsequently carried out, the coating compound turns into a spinel-based coating, in which the proportion by mass of spinel is over 90%.

Preferably the material compound contains very little to almost no silicon oxide for the coating. Very little silicon oxide should be viewed in this case as a proportion of not more than 2% by mass.

In a variation of the production method for the inventive ceramic heat shield element the coating mass is applied to an already sintered ceramic body. In a further sinter process with temperatures of up to a maximum of 1650° C. the compound is then converted into the spinel-based coating. In this manner ceramic heat shield elements which are already in service can especially be upgraded with poorly reactive mineral coating.

As an alternative to producing the spinel-based coating containing $Al_2O_2$ and MgO, the production of the coating can also be undertaken by applying a suspension containing spinel to the green body or the already sintered ceramic body and subsequent sintering.

To apply the coating compound or the suspension to the surface of the pressed or of the already fired ceramic body all methods can be used with which coating masses or suspensions can be applied to surfaces. In particular the coating compound or the suspension can be applied by spin coating, spraying or injection. Thermal injection methods such as plasma injection or flame injection are suitable for example.

In the described exemplary embodiment spinel forms the basis of the poorly reactive mineral coating 32. In alternative embodiments however corundum or zirconium oxide can also form the base of the poorly reactive mineral coating. The production of the coatings based on corundum or zirconium oxide is undertaken like the production of the coating based on spinel, however the sinter conditions are to be adapted to the other material compound of the coating.

The coating can essentially be applied, regardless of the materials on which it is based, to all types of ceramic components.

The invention claimed is:

1. A ceramic component, comprising:
   a ceramic body having a surface resistant to hot gas wherein the ceramic body consisting of about 10% to about 50% by mass mullite and about 50% to about 90% by mass corundum;
   a coating arranged on the hot gas resistant surface of the ceramic body, where the coating is based on spinel; and,
   wherein the ceramic component is exposed to operating temperatures in excess of 1000° C.

2. The ceramic component as claimed in claim 1, wherein the coating contains at least 90% by mass spinel.

3. The ceramic component as claimed in claim 2, wherein the coating contains at most 2% by mass silicon dioxide.

4. The ceramic component as claimed in claim 3, wherein the coating contains a doping.

5. The ceramic component as claimed in claim 4, wherein the coating contains a doping with elements of lanthanides or titanium.

6. The ceramic component as claimed in claim 1, wherein a material compound is applied to the hot gas resistant surface comprising over 60% by mass $Al_2O_2$ and up to about 40% by mass of MgO before sintering to form the spinel based coating.

* * * * *